United States Patent
Bhatt et al.

(10) Patent No.: US 9,945,684 B2
(45) Date of Patent: Apr. 17, 2018

(54) FREQUENCY-BASED DIRECTION GUIDANCE

(71) Applicant: Apple Inc., Cupertino, CA (US)

(72) Inventors: Nikhil Bhatt, Cupertino, CA (US); Ravi Nikhil Bhatt, Cupertino, CA (US); Mira Nicole Bhatt, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 190 days.

(21) Appl. No.: 14/500,460

(22) Filed: Sep. 29, 2014

(65) Prior Publication Data

US 2016/0091335 A1    Mar. 31, 2016

(51) Int. Cl.
G01C 21/36 (2006.01)
G01C 21/34 (2006.01)

(52) U.S. Cl.
CPC ..... *G01C 21/3484* (2013.01); *G01C 21/3617* (2013.01)

(58) Field of Classification Search
CPC .... G01C 21/34; G01C 21/36; G01C 21/3626; G01C 21/3484
See application file for complete search history.

(56) References Cited

U.S. PATENT DOCUMENTS

| | | | |
|---|---|---|---|
| 5,528,201 A | 6/1996 | Hanson | |
| 7,395,153 B1 * | 7/2008 | Nesbitt | G01C 21/3484 701/428 |
| 7,480,567 B2 | 1/2009 | Suomela et al. | |
| 7,512,487 B1 | 3/2009 | Golding et al. | |
| 7,917,288 B2 | 3/2011 | Cheung et al. | |
| 8,392,116 B2 | 3/2013 | Lehmann et al. | |
| 8,775,080 B2 | 7/2014 | Mizuno et al. | |
| 9,360,340 B1 * | 6/2016 | Bailiang | G01C 21/367 |
| 9,644,983 B2 | 5/2017 | Kandangath et al. | |
| 2005/0149252 A1 | 7/2005 | Brulle-Drews et al. | |
| 2006/0069500 A1 | 3/2006 | Hashizume | |
| 2009/0055088 A1 * | 2/2009 | Zhang | G01C 21/20 701/533 |
| 2010/0324816 A1 * | 12/2010 | Highstrom | G01C 21/367 701/533 |
| 2010/0332130 A1 | 12/2010 | Shimizu et al. | |
| 2013/0158854 A1 * | 6/2013 | Weir | G01C 21/3617 701/400 |
| 2013/0261954 A1 * | 10/2013 | Boschker | G01C 21/00 701/410 |
| 2013/0289872 A1 * | 10/2013 | Segev | G01C 21/34 701/467 |
| 2014/0142849 A1 * | 5/2014 | Ziezold | G01C 21/3641 701/533 |
| 2015/0168174 A1 * | 6/2015 | Abramson | G01C 21/3697 701/408 |

* cited by examiner

*Primary Examiner* — Yonel Beaulieu
*Assistant Examiner* — Martin A Weeks
(74) *Attorney, Agent, or Firm* — Fish & Richardson P.C.

(57) ABSTRACT

Frequency-based direction guidance is disclosed. In some implementations, a navigation system leverages frequent location information to filter navigation directions that are presented to a user of a navigation device. If a destination is a frequent location, the navigation system filters the navigation directions so that navigation directions associated with the destination are not presented to the user. If a departure location is a frequent location, the navigation system filters the directions so that directions associated with the departure location are not presented to the user.

20 Claims, 4 Drawing Sheets

UNFILTERED TURN-BY-TURN INSTRUCTIONS

Directions To 1Infinite Loop, Cupertino, CA 95014
19.1 mi   24 mins   6:00 PM arrival Departure Location: 500 Arguello St, Redwood City, CA 94063

1. Head northwest on Arguello St toward Fuller St         } 202
2. Turn right onto Whipple Ave
3. Merge onto US-101 S via the ramp to San Jose           } 204
4. Take the exit onto CA-85 S toward Santa Cruz/Cupertino
5. Take the exit onto I-280 S toward San Jose
6. Take the De Anza Blvd exit                             } 206
7. Turn right onto N De Anza Blvd
8. Take the 1st left onto Mariani Ave
9. Take the 1st left onto Infinite Loop Destination Location: 1 Infinite Loop, Cupertino, CA 95014

FILTERED TURN-BY-TURN INSTRUCTIONS — 208

Directions To 1Infinite Loop, Cupertino, CA 95014
19.1 mi   24 mins   6:00 PM arrival Departure Location: 500 Arguello St, Redwood City, CA 94063

1. Merge onto US-101 S via the ramp to San Jose           ⎫
2. Take the exit onto CA-85 S toward Santa Cruz/Cupertino ⎬ 204
3. Take the exit onto I-280 S toward San Jose             ⎭
4. Take the De Anza Blvd exit Destination Location: 1 Infinite Loop, Cupertino, CA 95014

FREQUENCY-BASED DIRECTION GUIDANCE

TECHNICAL FIELD

This disclosure relates generally to navigation systems.

BACKGROUND

Modern navigation systems often provide navigation directions for a selected route to a user in the form of spoken and/or visual directions. Navigation directions typically include directions from a departure location (such as a current location) to a destination location. More often than not, the streets and ingress/egress points at the departure and/or destination locations are known to the user, resulting in a number of unnecessary directions being presented to the user. These unnecessary directions are annoying and useless because the user often knows a better route out of a departure location or into a destination location causing the navigation system to continually recalculate directions when the user takes their preferred route. Additionally, unnecessary spoken and/or visual directions can distract the user, preventing the user from receiving more important navigation directions.

SUMMARY

Frequency-based direction guidance is disclosed. In some implementations, a navigation system leverages frequent location information to filter navigation directions that are presented to a user of a navigation device implementing the navigation system. If a destination location is a frequent location, the navigation system filters the directions so that directions associated with the destination are not presented to the user. If a departure location is a frequent location, the navigation system filters the directions so that directions associated with the departure location are not presented to the user.

In some implementations, a method comprises: receiving, by a navigation device, a route request including a departure location and a destination location; determining, by the navigation device, that the departure location or destination is a frequent location associated with the navigation device; generating, by the navigation device, navigation directions; and presenting, by the navigation device, a subset of the navigation directions, the subset of navigation directions excluding one or more navigation directions for leaving the departure location if the departure location is determined to be a frequent location or excluding one or more navigation directions for arriving at the destination location if the destination location is determined to be a frequent location.

In some implementations, a navigation device includes: one or more processors; memory coupled to the one or more processors and storing directions, which, when executed by the one or more processors, causes the one or more processors to perform operations comprising: receiving a route request including a departure location and a destination location; determining that the departure location or destination is a frequent location associated with the navigation device; generating navigation directions; and presenting a subset of the navigation directions, the subset of navigation directions excluding one or more navigation directions for leaving the departure location if the departure location is determined to be a frequent location or excluding one or more navigation directions for arriving at the destination location if the destination location is determined to be a frequent location.

Other implementations are directed to systems, devices and non-transitory, computer-readable storage mediums. Particular implementations disclosed herein provide one or more of the following advantages. Presenting a reduced set of navigation directions to the user of a navigation system can help avoid the need to recalculate the directions when a user takes a different route. Additionally, reducing unnecessary spoken and/or visual directions allows the user to focus their attention on more important directions.

The details of the disclosed implementations are set forth in the accompanying drawings and the description below. Other features, objects and advantages are apparent from the description, drawings and claims.

DESCRIPTION OF DRAWINGS

FIG. 2A illustrates a navigation display presenting unfiltered navigation directions.

FIG. 2B illustrates the navigation display of FIG. 2A presenting filtered navigation directions.

The same reference symbol used in various drawings indicates like elements.

DETAILED DESCRIPTION

Example System

Figure 1:
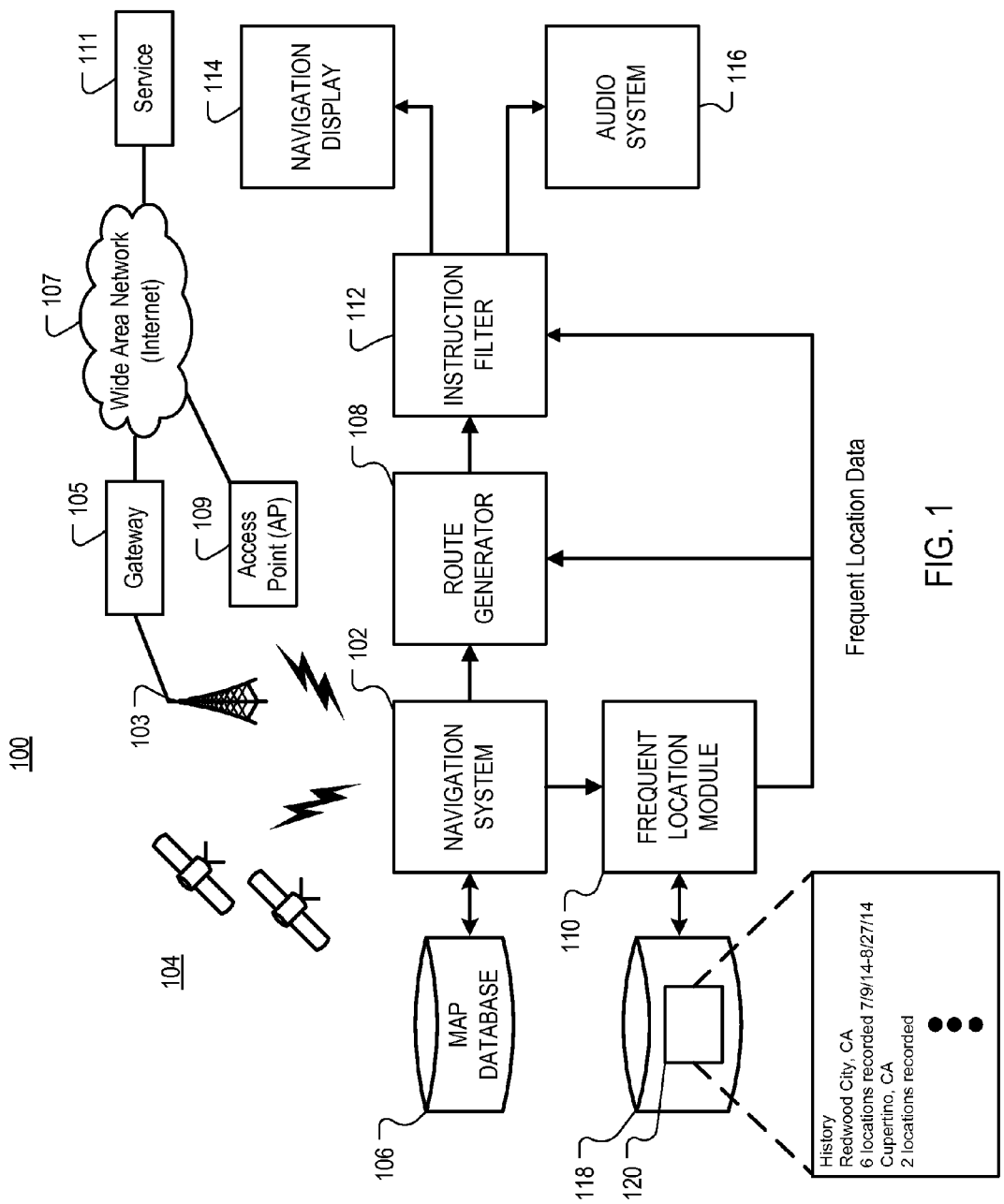
FIG. 1 is a block diagram of an example system for frequency-based direction guidance.

FIG. 1 is a block diagram of an example system 100 for frequency-based direction guidance. In some implementations, system 100 can include navigation system 102, route generator 108, instruction filter 112, navigation display 114, audio system 116 and database 118. System 100 can be implemented in software or hardware or a combination of software and hardware on a navigation device. A navigation device can be any device that is capable of providing navigation directions, including but not limited to: vehicle navigation systems, smart phones, tablet computers and wearable computers.

In some implementations, navigation system 102 is a Global Navigation Satellite System (GNSS) receiver, such as Global Navigation System (GPS) receiver. Navigation system 102 receives radio frequency (RF) signals from satellites 104 and computes an estimated location of the navigation device (implementing navigation system 102) using known position estimation algorithms (e.g., trilateration, Kalman filter). In some implementations, navigation system 102 also includes a wireless transceiver for connecting to a wireless network (e.g., WiFi network, cellular network, beacons) using known communication protocols (e.g., 3G, 4G). The wireless connection enables navigation system 102 to receive map data and other information (e.g., traffic information, access point locations) from service 111 over cellular network 103, gateway 105 and wide area network (WAN) 107 (e.g., the Internet) or through wireless access point (AP) 109 (e.g., a WiFi router) and WAN 107. Map data and other information can be stored in database 106.

Frequent location module 110 receives location data (e.g., latitude, longitude, altitude) from navigation system 102, determines frequent locations of the navigation device based on the location data and map data and updates frequent location list 120 in database 118. A frequent location is a frequent location of a navigation device implementing navigation system 102. Some examples of a frequent location can include but are not limited to a user's home, work or a point of interest (e.g., a coffee shop, gym, library). In some implementations, a frequent location is defined by a bounded geographic area (e.g., a polygon) that includes a threshold number of recorded locations of the navigation device. In some implementations, the geographic area can be defined by a circular geographic boundary with a specified radius value. For example, a frequent location can be a user's home address, which is the center coordinates of a circular geographic area and the size of the geographic area is determined by the specified radius value. In other implementations, the geographic area boundary of a frequent location can be defined by map boundaries (e.g., city boundaries).

In the example shown, 6 locations are recorded in frequent location list 120 for Redwood City, Calif. and 2 locations are recorded in frequent location list 120 for Cupertino, Calif. from Jul. 9, 2014 to Aug. 27, 2014. In this example, the user's home is in Redwood City and the user's place of work is in Cupertino, Calif. Specifying a time period or timestamp for each frequent location in list 120 allows frequent location module 110 to determine the freshness of the frequent location data so that a frequent location that was visited many times two years ago, but was rarely visited in the past two months, can be culled from frequent location list 120. A frequent location may also be specified by the user through a graphical user interface (GUI) or other input mechanism of the navigation device (e.g., a microphone and speech recognition system) or by searching a contact in a virtual address book that designates an address as the user's home or work address, for example.

Route generator 108 receives location data from navigation system 102 and a user route request (e.g., departure and destination locations) and uses this data to generate a route from the departure location to the destination location. In some implementations, route generator 108 implements a route planning algorithm, such as a version of Dijkstra's algorithm or Geometric Goal Directed Search (A*).

The generated route can be overlaid on a map that is rendered on navigation display 114 or spoken as voice commands by a virtual navigation assistant through audio system 116. For example, navigation directions can be generated and displayed on navigation display 114 or spoken by a digital assistant through audio system 116. The user can then follow the navigation directions to reach the destination location. The navigation directions can be displayed in a scrolling list and include information such as street names, ingress/egress points, explicit turn directions (left/right/straight, veer left/right), estimated miles to next turn, estimated time of arrival to the destination and any other useful navigation data (e.g., compass heading, landmarks, 3D imagery). Typically, navigation directions are detailed and numerous in the vicinity of the departure and destination locations. If the user deviates from the directions, route generator 108 may attempt to recalculate a new route based on the current location data provided by navigation system 102.

Instruction filter 112 receives navigation directions for the requested route from route generator 108 and frequent location data from frequent location module 110 and determines if any of the navigation directions are associated with route segments within a frequent location. In some implementations, the frequent location data includes frequent location boundaries. The frequent location boundaries and the route segment data can be represented as geographic coordinates in reference coordinate system (e.g., latitude, longitude, altitude). Instruction filter 112 determines if any of the geographic coordinates of the route segment fall within the boundary defining the frequent location. For any route segment that is within the bounded geographical area of the frequent location, instruction filter 112 determines if any navigation directions are associated with that route segment. The navigation directions that are associated with that route segment are filtered (e.g., concealed, collapsed, removed) from the complete set of navigation directions to generate a subset of navigation directions for presenting on navigation display 114 and/or audio system 116.

In some implementations, the user can specify in a setting pane or menu additional criteria for filtering the navigation directions. For example, the user can specify a custom radius value of the size of the frequent location (assuming a circular boundary) to override a default radius generated by frequent location module 110.

In some implementations, a timestamp (e.g., date range) for frequent location data can be used by instruction filter 112 to determine whether to filter the navigation directions. For example, if the user visited a frequent location often in the distant past but has not visited the frequent location in the recent past (e.g., weeks, months), then instruction filter 112 can be configured to not filter the navigation directions.

FIG. 2A illustrates a navigation display for displaying navigation directions (e.g., turn-by-turn directions). In the example shown, navigation display 200a displays a complete (unfiltered) set of navigation directions for a route from 500 Arguello St., Redwood City, Calif. to 1 Infinite Loop, Cupertino, Calif. In this example, Redwood City and Cupertino are frequent locations.

The navigation directions for this example can be divided conceptually into three route segments. A first segment of navigation directions 202 includes directions for navigating in the immediate vicinity of the departure location (500 Arguello Street). Navigation directions 202 are likely not useful to the user who is assumed to know how to get to US-101 from the departure location. A second segment of navigation directions 204 includes directions that are most important to the user as they instruct the user on how to navigate highways and interstates. In the example shown, navigation directions 204 instruct the user to merge onto US-101, transition to CA-85, merge onto I-280 and exit at De Anza Blvd. A third segment of navigation directions 206 includes directions for navigating in the immediate vicinity of the destination location (1 Infinite Loop). Navigation directions 206 are likely not useful to the user who is assumed to know how to get to the destination location from the De Anza Blvd exit.

FIG. 2B illustrates the navigation display of FIG. 2A with filtered navigation directions. In the example shown, navigation instruction segments 202, 206 are filtered from the complete (unfiltered) set of navigation directions generated by route generator 108 and then presented on navigation display 200b. In some implementations, directions are filtered from a point of departure until a road having a specified road priority is reached. A road priority indicates the type of traffic that a road supports, the physical geometry of the road and its connectivity to other roads. Some roads are bigger and support more traffic (e.g., freeways, expressways, major artery, minor artery, national highway, regional highway). For example, in some implementations, directions can be excluded from a point of departure in a frequent location until a freeway is reached, which can be determined based on map data or other data, including but not limited to: road labeling, speed limits, number of lanes and any other information that indicates road type. In the example shown, Arguello Street and Whipple Avenue are excluded and the first direction in the subset of directions is "Merge onto US-101 S via the ramp to San Jose." In this example, US-101 is a freeway and the previous directions were excluded. In some implementations, the user can specify the road type through a graphical user interface using a settings pane, menu or other user interface element.

The filtering ensures that only the more important navigation directions 204 are displayed to the user (or spoken through audio system). Additionally, instruction filter 112 provides route generator 108 with navigation directions 204, so that when the user deviates from navigation directions 204, route generator 108 recalculates navigation directions 204 and not navigation directions 202, 206. In some implementations, route generator 108 is configured to avoid recalculating navigation directions until the navigation device reaches the first direction after the filtered directions. For example, if the user stops at the post office on the way to US-101, route generator 108 does not try to recalculate the navigation directions.

In some implementations, navigation system 102 can continue to determine estimated time of arrival (ETA) and distance to destination even though the directions have been filtered.

In some implementations, user interface element 208 can be displayed with the filtered navigation instructions 204. User interface element 208 (e.g., a virtual button) can be activated by the user to expand the filtered set of navigation directions into the complete set of navigation directions or some portion thereof. In some implementations, the directions associated with a frequent location can be collapsed under a simplified heading such as "Go to US-101" that can be tapped or otherwise activated by the user (e.g., a voice command) to reveal the detailed directions in the frequent location. This feature may assist people who visit a frequent location frequently but don't know how to navigate the streets of the frequent location. This feature would also assist users to access the complete set of navigation directions in case the frequent location data was faulty. Finally, this feature is useful to users who take mass transit and that may frequent some locations only on mass transit (e.g., a bus, train, subway). If they need to drive, for example, a car to the frequent location they may have no idea of how to enter or exit the frequent location.

Although the example scenario described above includes two frequent locations corresponding to the departure and destination locations of a route, there are other possible frequent locations. For example, if a frequent location is on the way to a destination (hereafter referred to as "an intermediate frequent location"), route generator 108 could instruct the user on how to navigate to the intermediate frequent location using filtered navigation directions, followed by unfiltered navigation directions from the frequent location to the final destination. For example, a user wants to depart from home in Redwood City (a frequent location) and travel to an unfamiliar antique store in San Francisco, Calif. There is a coffee shop that the user frequents in Daly City that is on the way to San Francisco. In this scenario, route generator 108 could first provide filtered directions for navigating from Redwood City (a frequent departure location) to the coffee shop in Daly City (an intermediate frequent location), followed by unfiltered directions for navigating from the coffee shop to the antique store. In some implementations, the system can track that the user has travelled a path between home and the coffee shop. If the path itself is frequently travelled, filtered directions can be presented to the user that excludes directions between the frequent locations of home and the coffee shop. For example, the direction "First, drive to Starbucks® coffee shop on Mission Street" can be presented, followed by unfiltered directions from Starbucks® to the antique store.

Example Processes

Figure 3:
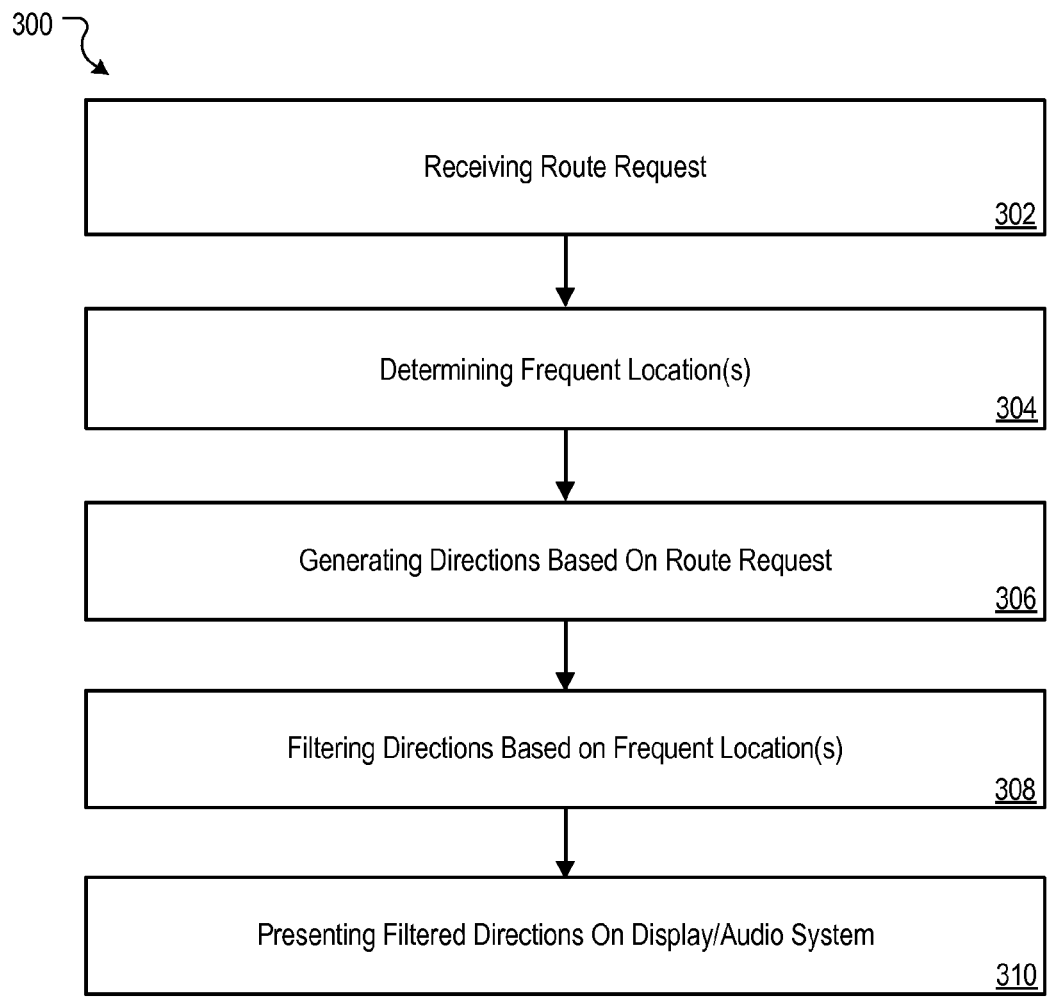
FIG. 3 is a flow diagram of an example process for frequency-based direction guidance.

FIG. 3 is a flow diagram of an example process 300 for frequency-based route guidance. In some implementations, process 300 can be implemented by navigation device architecture 400, as described in reference to FIG. 4.

In some implementations, process 300 can begin by receiving a route request (302). For example, a user can enter departure and destination locations in a GUI of a navigation device (e.g., a smart phone) or the route request can be made by an application. In some implementations, the departure location can be the current location of the navigation device. In some implementations, the route request is generated by an application.

Process 300 can continue by determining one or more frequent locations for the navigation device (304). For example, a location that meets or exceeds a threshold number of recorded locations of the navigation device over time period can be stored in the frequent location list as a frequent location. The locations can be provided by a navigation system using one or more of satellite-based (e.g., GPS) or terrestrial-based (e.g., WiFi, Cellular) location data. A frequent location can be an intermediate frequent location between the original departure location and the final destination of the route.

Process 300 can continue by generating directions (306). For example a route generator can generate navigation directions using departure and destination locations and a routing algorithm (e.g., Dijkstra's algorithm, A*). The navigation directions can be presented in a scrollable list and include any desired amount of data, such as street names, names of ingress/exit points, explicit turn directions (left/right/straight, veer left/right), estimated number of miles to the next turn, etc.

Process 300 can continue by filtering the directions based on the one or more frequent locations (308). For example, navigation directions associated with route segments that fall within a geographic boundary of a frequent location can be identified and filtered from the complete set of navigation directions generated by the route generator.

Process 300 can continue by presenting the filtered directions on a navigation display or audio system (310). The navigation display can be a screen or heads-up display. The audio system can include a navigation assistant that speaks the filtered directions through a loudspeaker, a pair of headphones or headset.

Example Client Architecture

Figure 4:
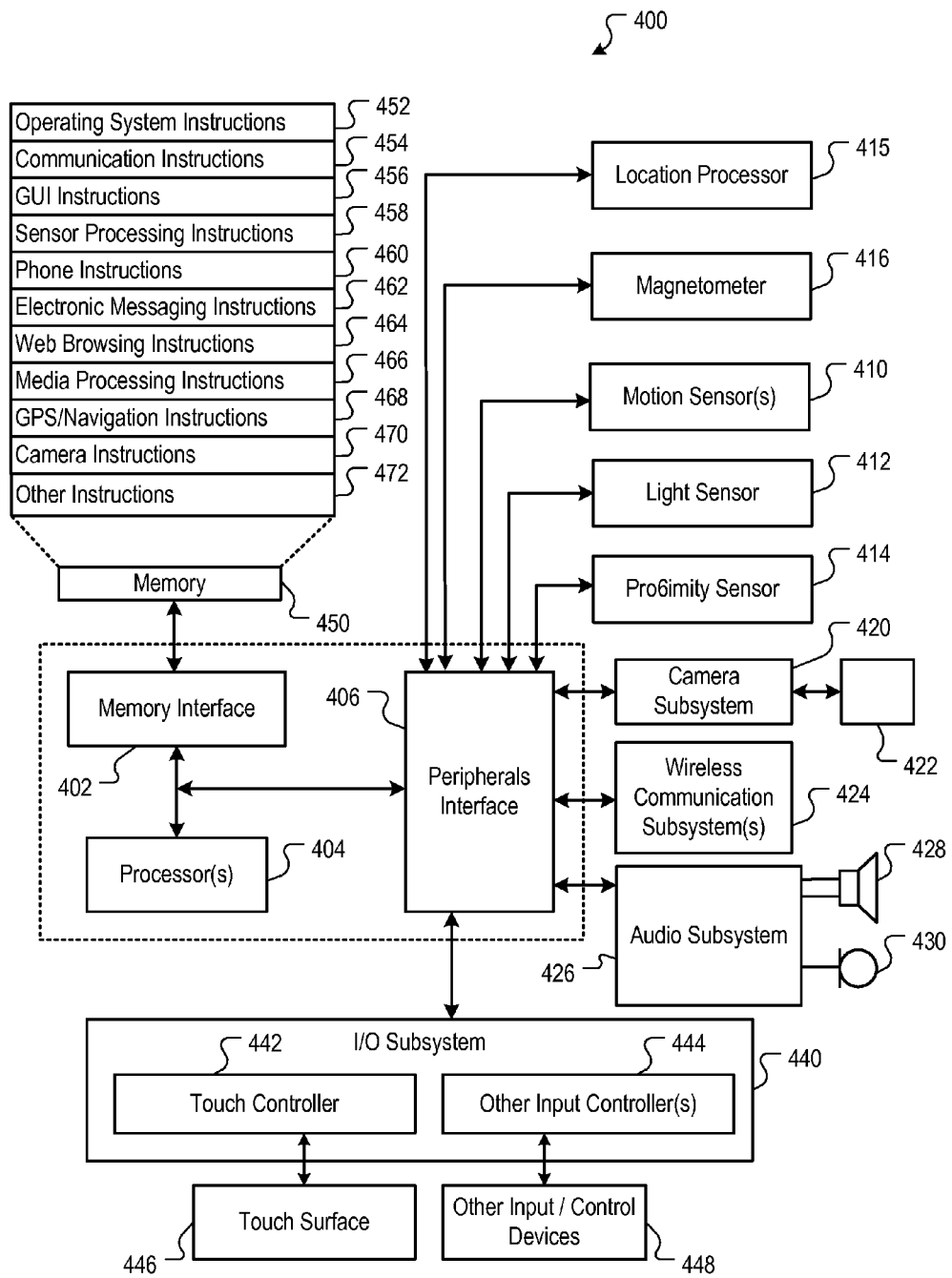
FIG. 4 is a block diagram of example navigation device architecture for implementing the features and processes described in reference to FIGS. 1-3.

FIG. 4 is a block diagram of example client device architecture 400 for implementing the features and processes described in reference to FIGS. 1-3. Architecture 400 may be implemented in any mobile device for generating the features described in reference to FIGS. 1-3, including but not limited to portable computers, smart phones and tablet computers, game consoles, wearable computers and the like.

Architecture 400 may include memory interface 402, data processor(s), image processor(s) or central processing unit(s) 404, and peripherals interface 406. Memory interface 402, processor(s) 404 or peripherals interface 406 may be separate components or may be integrated in one or more integrated circuits. One or more communication buses or signal lines may couple the various components.

Sensors, devices, and subsystems may be coupled to peripherals interface 406 to facilitate multiple functionalities. For example, motion sensor 410, light sensor 412, and proximity sensor 414 may be coupled to peripherals interface 406 to facilitate orientation, lighting, and proximity functions of the device. For example, in some implementations, light sensor 412 may be utilized to facilitate adjusting the brightness of touch surface 446. In some implementations, motion sensor 410 (e.g., an accelerometer, gyros) may be utilized to detect movement and orientation of the device. Accordingly, display objects or media may be presented according to a detected orientation (e.g., portrait or landscape).

Other sensors may also be connected to peripherals interface 406, such as a temperature sensor, a biometric sensor, or other sensing device, to facilitate related functionalities.

Location processor 415 (e.g., GPS receiver chip) may be connected to peripherals interface 406 to provide geo-referencing. Electronic magnetometer 416 (e.g., an integrated circuit chip) may also be connected to peripherals interface 406 to provide data that may be used to determine the direction of magnetic North. Thus, electronic magnetometer 416 may be used as an electronic compass.

Camera subsystem 420 and an optical sensor 422, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 424. Communication subsystem(s) 424 may include one or more wireless communication subsystems. Wireless communication subsystems 424 may include radio frequency receivers and transmitters and/or optical (e.g., infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 424 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., WiFi, WiMax), code division multiple access (CDMA) networks, NFC and a Bluetooth™ network. Wireless communication subsystems 424 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

Audio subsystem 426 may be coupled to a speaker 428 and one or more microphones 430 to facilitate voice-enabled functions, such as voice recognition, voice replication, digital recording, and telephony functions.

I/O subsystem 440 may include touch controller 442 and/or other input controller(s) 444. Touch controller 442 may be coupled to a touch surface 446. Touch surface 446 and touch controller 442 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 446. In one implementation, touch surface 446 may display virtual or soft buttons and a virtual keyboard, which may be used as an input/output device by the user.

Other input controller(s) 444 may be coupled to other input/control devices 448, such as one or more buttons, rocker switches, thumb-wheel, infrared port, USB port, and/or a pointer device such as a stylus. The one or more buttons (not shown) may include an up/down button for volume control of speaker 428 and/or microphone 430.

In some implementations, device 400 may present recorded audio and/or video files, such as MP3, AAC, and MPEG video files. In some implementations, device 400 may include the functionality of an MP3 player and may include a pin connector for tethering to other devices. Other input/output and control devices may be used.

Memory interface 402 may be coupled to memory 450. Memory 450 may include high-speed random access memory or non-volatile memory, such as one or more magnetic disk storage devices, one or more optical storage devices, or flash memory (e.g., NAND, NOR). Memory 450 may store operating system 452, such as Darwin, RTXC, LINUX, UNIX, OS X, WINDOWS, or an embedded operating system such as VxWorks. Operating system 452 may include instructions for handling basic system services and for performing hardware dependent tasks. In some implementations, operating system 452 may include a kernel (e.g., UNIX kernel).

Memory 450 may also store communication instructions 454 to facilitate communicating with one or more additional devices, one or more computers or servers, including peer-to-peer communications. Communication instructions 454 may also be used to select an operational mode or communication medium for use by the device, based on a geographic location (obtained by the GPS/Navigation instructions 468) of the device. Memory 450 may include graphical user interface instructions 456 to facilitate graphic user interface processing, including a touch model for interpreting touch inputs and gestures; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GPS/Navigation instructions 468 to facilitate GPS and navigation-related processes, including the components of system 200 described in reference to FIG. 2; camera instructions 470 to facilitate camera-related processes and functions; and other instructions 472 for performing some or all of the processes, as described in reference to FIGS. 1-3.

Each of the above identified instructions and applications may correspond to a set of instructions for performing one or more functions described above. These instructions need not be implemented as separate software programs, procedures, or modules. Memory 450 may include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with an author, the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data.

For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   receiving, by a navigation device, a route request including a departure location and a destination location;
   determining, by the navigation device, that the departure location or destination is a frequent location associated with the navigation device;
   generating, by the navigation device, a set of navigation directions for the requested route that starts from the departure location and ends at the destination location; and
   displaying, by the navigation device, a subset of the navigation directions on a navigation display of the navigation device, the subset of navigation directions excluding one or more navigation directions from the set of navigation instructions if the departure location or destination location is determined to be a frequent location and a last time the requested route was travelled by the navigation device is less than a threshold time.

2. The method of claim 1, further comprising:
   determining, by the navigation device, that a user of the navigation device had previously travelled a path between the departure location and an intermediate location; and
   excluding one or more navigation directions from the displayed subset of navigation directions for traveling to the intermediate location.

3. The method of claim 1, where the frequent location is defined by a geographic boundary, further comprising:
   determining that a route segment is within the geographic boundary; determining navigation directions associated with the route segment; and including the determined navigation directions in the subset of navigation directions.

4. The method of claim 3, where the geographic boundary defines a circular geographic area having a size determined by a radius value.

5. The method of claim 4, where the radius value is specified by a user of the navigation device.

6. The method of claim 1, where the frequent location is determined from a description in a contact of a virtual address book.

7. The method of claim 1, where the frequent location is determined by meeting or exceeding a threshold number of recorded locations of the navigation device over a period of time.

8. The method of claim 1, where excluding one or more navigation directions for leaving the departure location includes excluding directions from the departure location until a road having a specified road priority is reached.

9. The method of claim 8, where a road priority is determined by map data.

10. The method of claim 1, further comprising avoiding recalculating navigation directions until the navigation device reaches a first direction after the excluded directions.

11. A navigation device, comprising:
    one or more processors;
    memory coupled to the one or more processors and storing directions, which, when executed by the one or more processors, causes the one or more processors to perform operations comprising:
    receiving a route request including a departure location and a destination location;
    determining that the departure location or destination is a frequent location associated with the navigation device;
    generating a set of navigation directions for the requested route that starts from the departure location and ends at the destination location: and
    displaying a subset of the navigation directions on a navigation display of the navigation device, the subset of navigation directions excluding one or more navigation directions from the set of navigation instructions if the departure location or destination location is determined to be a frequent location and a last time the requested route was travelled by the navigation device is less than a threshold time.

12. The navigation device of claim 11, further comprising:
    determining that a user of the navigation device had previously travelled a path between the departure location and an intermediate location; and excluding one or more navigation directions from the displayed subset of navigation directions for traveling to the intermediate location.

13. The navigation device of claim 11, where the frequent location is defined by a geographic boundary, further comprising:
    determining that a route segment is within the geographic boundary;
    determining navigation directions associated with the route segment; and
    including the determined navigation directions in the subset of navigation directions.

14. The navigation device of claim 13, where the geographic boundary defines a circular geographic area having a size determined by a radius value.

15. The navigation device of claim 14, where the radius value is specified by a user of the navigation device.

16. The navigation device of claim 11, where the frequent location is determined from a description in a contact of a virtual address book.

17. The navigation device of claim 11, where the frequent location is determined by meeting or exceeding a threshold number of recorded locations of the navigation device over a period of time.

18. The navigation device of claim 11, where excluding one or more navigation directions for leaving the departure location includes excluding directions from the departure location until a road having a specified road priority is reached.

19. The navigation device of claim 18, where a road priority is determined by map data.

20. The navigation device of claim 11, further comprising avoiding recalculating navigation directions until the navigation device reaches a first direction after the excluded directions.

* * * * *